(12) United States Patent
Sato (10) Patent No.: US 9,726,809 B2
(45) Date of Patent: Aug. 8, 2017

(54) VEHICLE LIGHTING UNIT

(71) Applicant: Stanley Electric Co., Ltd., Tokyo (JP)

(72) Inventor: Koji Sato, Tokyo (JP)

(73) Assignee: STANLEY ELECTRIC CO., LTD., Tokyo (JP)

(\*) Notice: Subject to any disclaimer, the term of this patent is extended or adjusted under 35 U.S.C. 154(b) by 7 days.

(21) Appl. No.: 14/883,066

(22) Filed: Oct. 14, 2015

(65) Prior Publication Data

US 2016/0116666 A1    Apr. 28, 2016

(30) Foreign Application Priority Data

Oct. 24, 2014  (JP) .................................. 2014-216968

(51) Int. Cl.
*F21V 1/00*    (2006.01)
*F21V 8/00*    (2006.01)
(Continued)

(52) U.S. Cl.
CPC ......... *G02B 6/0068* (2013.01); *B60Q 1/0041* (2013.01); *B60Q 1/0052* (2013.01);
(Continued)

(58) Field of Classification Search
CPC .. G02B 6/0068; G02B 6/0051; G02B 6/0073; G02B 6/0076; G02B 6/0078;
(Continued)

(56) References Cited

U.S. PATENT DOCUMENTS

2005/0072032 A1\* 4/2005 McCollum ................ F21V 5/00
    40/546
2007/0068370 A1\* 3/2007 Ting .................. G02F 1/133603
    84/645
(Continued)

FOREIGN PATENT DOCUMENTS

DE    10 2011 016 000 A1    10/2012
EP      2 354 637 A2          8/2011
(Continued)

OTHER PUBLICATIONS

The extended European search report for the related European Patent Application No. 151910973 dated Apr. 13, 2016.

*Primary Examiner* — Andrew Coughlin
*Assistant Examiner* — Glenn Zimmerman
(74) *Attorney, Agent, or Firm* — Kenealy Vaidya LLP (57) ABSTRACT

A vehicle lighting unit can include a first LED and a second LED each having a different color; a first light guiding lens and a second light guiding lens disposed in front of the first and second LEDs, respectively, configured to guide light rays from the first and second LED, respectively, to cause the light rays to exit therethrough forward; and a diffusion lens disposed in front of the first and second light guiding lenses, configured to diffuse the light rays from the first and second light guiding lenses. The light exiting faces of the first and second light guiding lenses can be configured to be long and adjacent to each other in the vertical direction with the lengthwise directions coincide with each other. The diffusion lens can have a long shape so as to cover the entire
(Continued)

front light exiting faces of the first and second light guiding lenses.

7 Claims, 7 Drawing Sheets

(51) Int. Cl.
    *F21S 8/10*     (2006.01)
    *B60Q 1/00*     (2006.01)
    *F21Y 115/10*     (2016.01)
    *F21Y 113/13*     (2016.01)
    *B60Q 1/38*     (2006.01)

(52) U.S. Cl.
    CPC ............ *B60Q 1/0058* (2013.01); *F21S 48/00* (2013.01); *F21S 48/215* (2013.01); *F21S 48/2243* (2013.01); *F21S 48/2262* (2013.01); *F21S 48/2281* (2013.01); *G02B 6/0051* (2013.01); *G02B 6/0073* (2013.01); *G02B 6/0076* (2013.01); *G02B 6/0078* (2013.01); *B60Q 1/38* (2013.01); *B60Q 2400/20* (2013.01); *B60Q 2400/30* (2013.01); *F21Y 2113/13* (2016.08); *F21Y 2115/10* (2016.08)

(58) Field of Classification Search
    CPC ..... B60Q 1/0041; B60Q 1/0052; F21S 48/00; F21S 48/215; F21S 48/2243; F21S 48/2262; F21S 48/2281; F21Y 2113/13; F21Y 2115/10; F21Y 2101/00
    USPC ....... 362/509, 612, 613, 616, 617, 538, 543, 362/545, 217.02
    See application file for complete search history.

(56) References Cited

U.S. PATENT DOCUMENTS

| | | | |
|---|---|---|---|
| 2009/0273732 A1* | 11/2009 | Shimura | G02B 6/0016 349/65 |
| 2013/0021815 A1 | 1/2013 | Koizumi | |
| 2014/0071703 A1 | 3/2014 | Motomura | |
| 2014/0247616 A1 | 9/2014 | Arrivet et al. | |
| 2016/0109084 A1* | 4/2016 | Potter | F21S 48/215 362/511 |

FOREIGN PATENT DOCUMENTS

| | | |
|---|---|---|
| JP | 2011-138695 A | 7/2011 |
| JP | 2012-248358 A | 12/2012 |

* cited by examiner

VEHICLE LIGHTING UNIT

This application claims the priority benefit under 35 U.S.C. §119 of Japanese Patent Application No. 2014-216968 filed on Oct. 24, 2014, which is hereby incorporated in its entirety by reference.

TECHNICAL FIELD

The presently disclosed subject matter relates to vehicle lighting units to be installed on a vehicle body, and in particular, a vehicle lighting unit capable of emitting light rays with a plurality of colors from a single light emitting part.

BACKGROUND ART

Some conventionally known vehicle lighting units to be installed on a vehicle body can include those capable of emitting light rays with a plurality of colors from a single light emitting part so as to function as a plurality of types of lamp.

Japanese Patent Application Laid-Open No. 2012-248358 discloses this type of vehicle lighting unit, in which a first light source is allowed to face to one side end face of a light guiding plate while a second light source is allowed to face to the other side end face of the light guiding plate. Then, the turning ON and OFF of the first and second light sources are controlled to be switched over, so as to illuminate the front face of the light guiding plate with the light emitted from any or both of the first and second light sources. Thus, the front face can be colored with any of the colors of the first and/or second light source(s).

However, since the vehicle lighting unit described in Japanese Patent Application Laid-Open No. 2012-248358 utilized such a light guiding plate, which may adversely provide a wider emission area. Accordingly, it is difficult to obtain a thin line-shaped emission area. In order to achieve the formation of a line-shaped emission area, it is conceivable to use a light guiding bar-shaped member. However, it may be difficult to control the light distribution with the configuration using such a light guiding bar-shaped member, resulting in low light utilization efficiency.

SUMMARY

The presently disclosed subject matter was devised in view of these and other problems and features in association with the conventional art. According to an aspect of the presently disclosed subject matter, a vehicle lighting unit can emit light rays with at least two different colors from a single line-shaped light emitting part while the light utilizing efficiency can be improved as compared with the conventional lighting unit.

According to another aspect of the presently disclosed subject matter, a vehicle lighting unit can include a first LED and a second LED each having a different color; a first light guiding lens and a second light guiding lens that are disposed in front of the first LED and the second LED, respectively, the first light guiding lens and the second light guiding lens configured to guide light rays emitted from the first LED and the second LED, respectively, to cause the light rays to exit through respective light exiting faces of the first and second guiding lenses forward; and a diffusion lens disposed in front of the first light guiding lens and the second light guiding lens, configured to diffuse the light rays exiting from the first light guiding lens and the second light guiding lens while allowing the light rays to pass therethrough forward. The light exiting faces of the first light guiding lens and the second light guiding lens can be configured to be long and juxtaposed with each other in a direction perpendicular to a lengthwise direction thereof with the lengthwise directions coincide with each other. The diffusion lens can have a long shape so as to cover the entire front light exiting faces of the first and second light guiding lenses.

According to another aspect of the presently disclosed subject matter, the vehicle lighting unit according to the previous aspect can be configured such that the first LED can be configured to emit more amounts of light rays than the second LED. Here, the vehicle lighting unit can have a plurality of the second LEDs, the number of which is larger than the number of the first LEDs. Namely, the LEDs with less amount of the emission light can be provided in more number than the LEDs with larger amount of the emission light. Accordingly, the number of the second light guiding lenses is larger than the number of the first light guiding lenses according to the numbers of the first LEDs and the second LEDS. The second light guiding lenses can be disposed such that the light exiting faces thereof are continuously arranged in its longitudinal direction. If two or more first light guiding lenses are provided, the first light guiding lenses can be disposed such that the light exiting faces thereof are continuously arranged in its longitudinal direction. Furthermore, an entire length of the light emission faces of the first light guiding lenses may be equal to an entire length of the light emission faces of the second light guiding lenses. In this case, the length of the light emission face of the first light guiding lens can be made different from the length of the light emission face of the second light guiding lens. Alternatively, the entire lengths of them can be adjusted by appropriately varying the lengths of the light emission faces of the first light guiding lenses and the lengths of the light emission faces of the second light guiding lenses.

According to still another aspect of the presently disclosed subject matter, the vehicle lighting unit according to any of the previous aspects can be configured such that the first light guiding lens and the second light guiding lens can be provided to be formed in a curved-line shape as a whole when viewed from their front side.

In the first aspect of the presently disclosed subject matter, when the first LED is lit, the light rays with a particular color emitted from the first LED can be guided by the first light guiding lens and allowed to exit through the elongated light exiting face of the first light guiding lens. Then, the exiting light rays can be incident on the diffusion lens disposed in front of the first light guiding lens, so that the diffusion lens can be irradiated with the light rays with the particular color of the first LED. When the second LED is lit, the light rays with a particular color emitted from the second LED can be guided by the second light guiding lens and allowed to exit through the elongated light exiting face of the second light guiding lens. Then, the exiting light rays can be incident on the diffusion lens disposed in front of the second light guiding lens, so that the diffusion lens can be irradiated with the light rays with the particular color of the first LED.

At this point, the light exiting faces of the first light guiding lens and the second light guiding lens can be configured to be long and juxtaposed with each other in a direction perpendicular to a lengthwise direction thereof with the lengthwise directions coincide with each other, meaning that they can be adjacent to each other in the thickness direction as shown in the drawings. Furthermore, the diffusion lens can have a long shape so as to cover the entire front light exiting faces of the first and second light guiding lenses, to diffuse the light rays from the first and second light guiding lenses. When the first LED is turned on, a first portion of the diffusion lens can emit light, while, when the second LED is turned on, a second portion of the diffusion lens adjacent to the first portion can emit light. Since the first portion and the second portion of the diffusion lens are significantly closely disposed, the portions can be observed as if the same portion can emit different colored light rays.

Furthermore, the light rays emitted forward from the LED can be guided by the light guiding lens disposed in front of the LED to exit through the light exiting face thereof. This configuration can improve the light utilizing efficiency more than that in a conventional case where a light guiding bar-shaped member with a low light utilizing efficiency is used.

Therefore, the light utilizing efficiency can be improved while the single line-shaped light emitting part (the single diffusion lens) can be illuminated with two different colored light rays.

Furthermore, according to another aspect, the first LED can be configured to emit more amount of light rays than the second LED. In addition, the number of the second LEDs, which each can emit less amount of light rays, can be made larger than the number of the first LEDs, which each can emit larger amount of light rays, meaning that the number of the second light guiding lenses is correspondingly larger than the number of the first light guiding lenses. The long light emission faces of them can be arranged to be continued in the lengthwise direction. In this case, the lengths of the first and second light guiding lenses (the light emission faces) can be changed so that the entire length of the continued light emission faces of the first light guiding lenses are equal to that of the continued light emission faces of the second light guiding lenses.

With this configuration, even when two types of LEDS each having a different amount of light rays are used, the light amounts can be appropriately balanced to emit light in the same or similar amount through the diffusion lens.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments.

Figure 1:
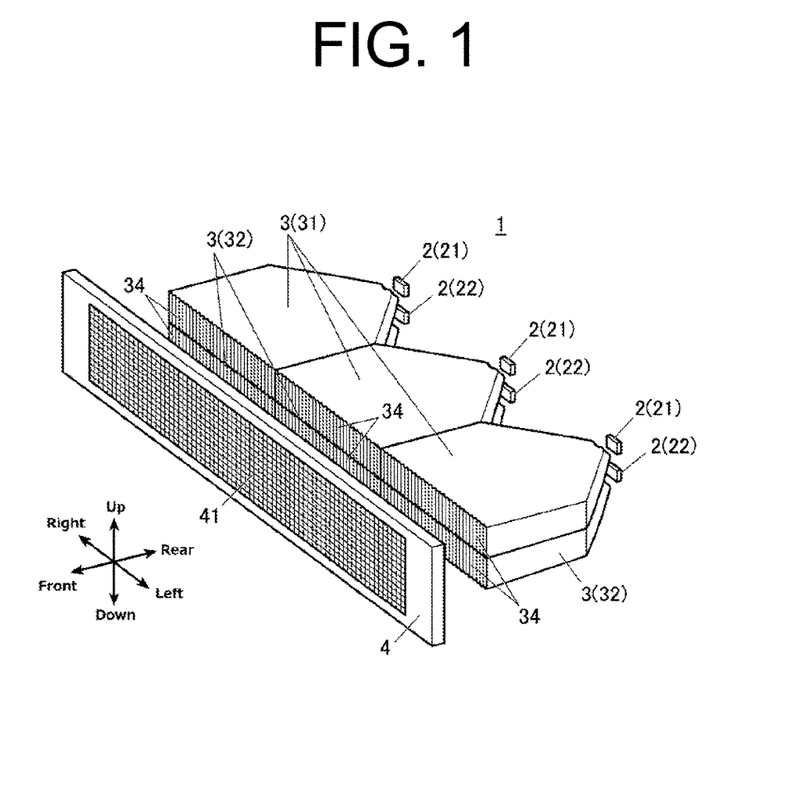
FIG. 1 is a perspective view of essential parts of a vehicle lighting unit made in accordance with principles of the presently disclosed subject matter.
Figure 2:
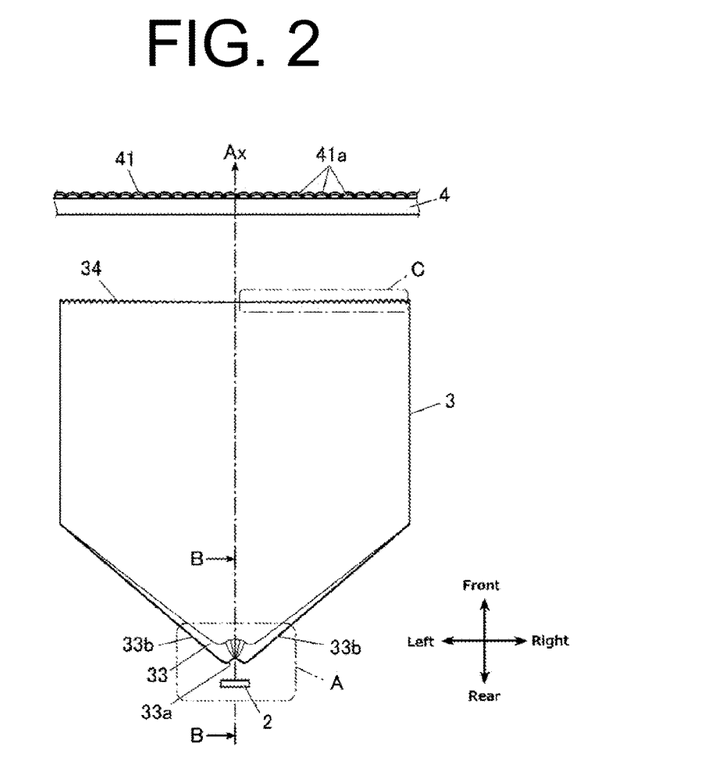
FIG. 2 is a plan view of parts corresponding to each LED in the vehicle lighting unit according to the present exemplary embodiment.
Figure 3A:
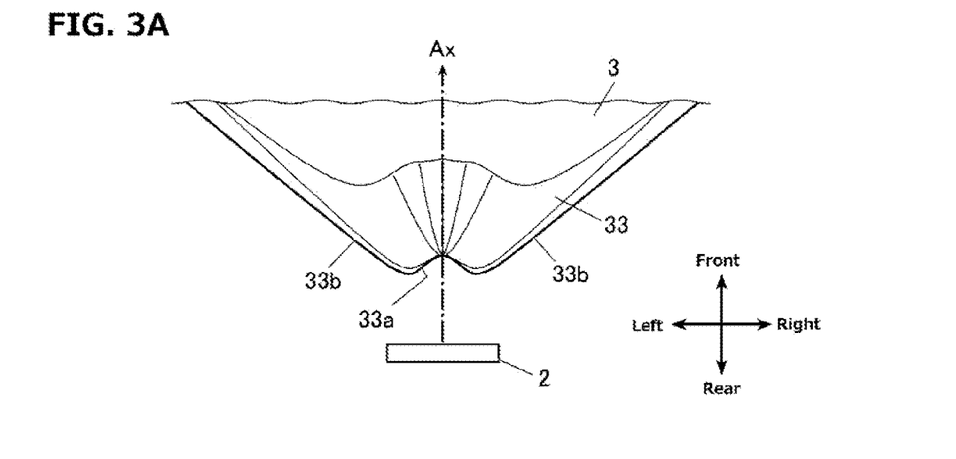
FIGS. 3A, 3B, and 3C are an enlarged view of part A in FIG. 2; a cross-sectional view taken along line B-B in FIG. 2; and an enlarged view of part C in FIG. 2, respectively.
Figure 3B:
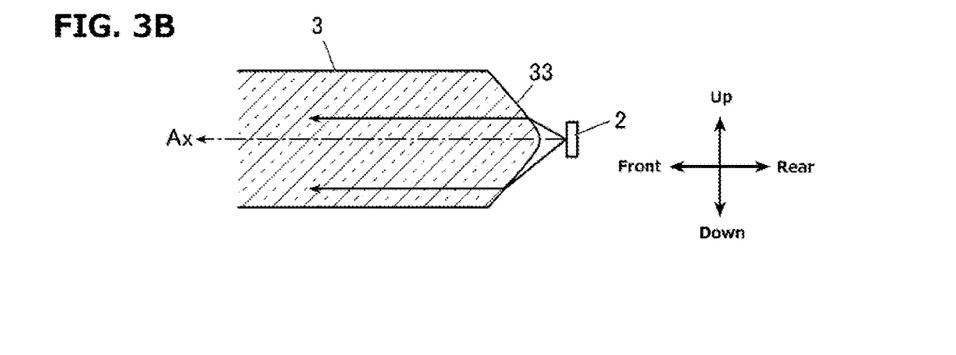
Figure 3C:
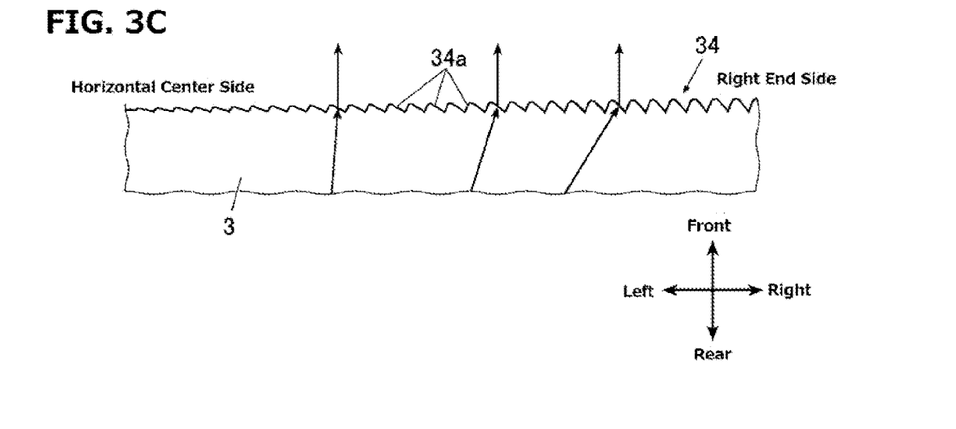
Figure 4A:
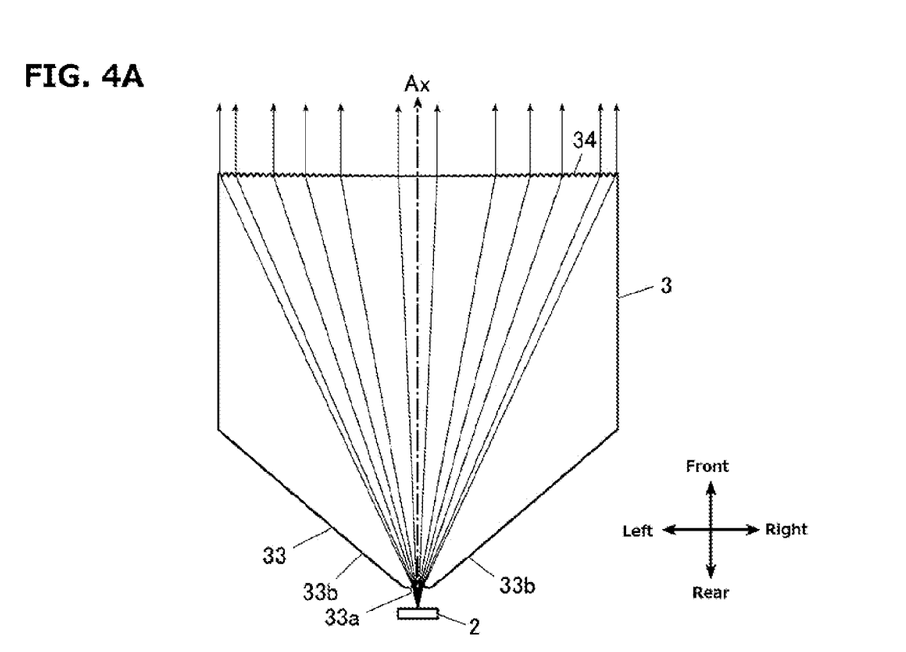
FIGS. 4A and 4B are each a plan view illustrating the manner in which the light rays are refracted at a light incident face of a light guiding lens.
Figure 4B:
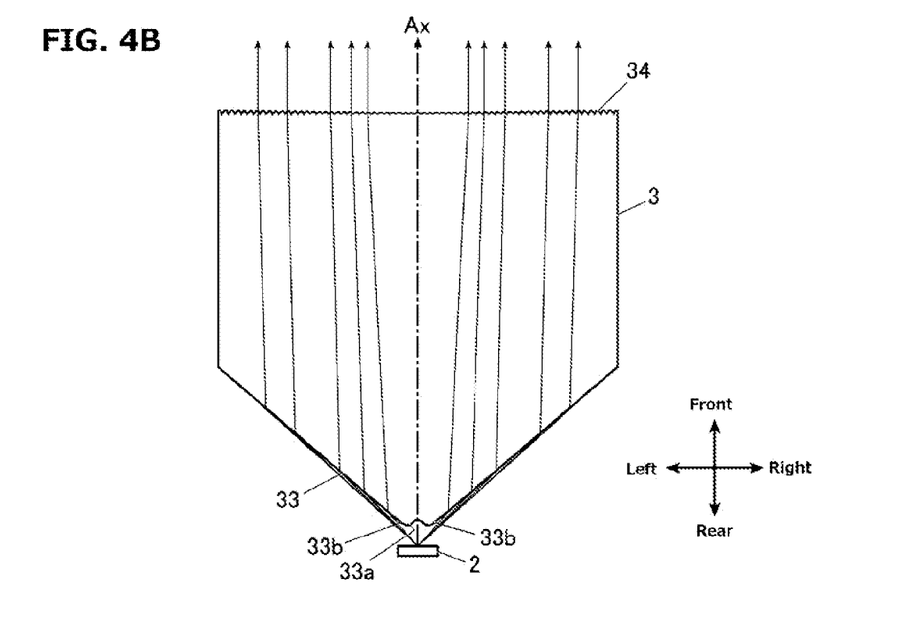

FIG. 1 is a perspective view of essential parts of a vehicle lighting unit 1 made in accordance with the principles of the presently disclosed subject matter. FIG. 2 is a plan view of parts corresponding to each LED in the vehicle lighting unit 1. FIGS. 3A, 3B, and 3C are an enlarged view of part A in FIG. 2; a cross-sectional view taken along line B-B in FIG. 2; and an enlarged view of part C in FIG. 2, respectively. Furthermore, FIGS. 4A and 4B are each a plan view illustrating the manner in which the light rays are refracted at a light incident face 33 of a light guiding lens 3.

Note that the directions used herein are defined so that the direction in which light rays travel is the front direction (to the front side, forward), and the flat plate shape of the light guiding lens 3 is spread in the horizontal direction (including left-right direction and front-rear direction) and its thickness direction is the vertical direction perpendicular to the horizontal direction.

As illustrated in FIGS. 1 and 2, the vehicle lighting unit 1 can include a plurality of light emitting diodes (LEDs) 2 (in the present exemplary embodiment, six LEDs), and a plurality of light guiding lenses 3 (in the present exemplary embodiment, six light guiding lenses) corresponding to the plurality of LEDs 2, and a diffusion lens 4.

Each of the LEDs 2 can be disposed such that an optical axis Ax thereof is directed forward substantially in a front-rear direction. Then, three LEDs 2 out of six LEDs can be arranged side by side while two lines of three LEDs 2 can be arranged side by side, meaning that they are arranged in a two by three matrix. Each of the LEDs 2 can emit light rays forward and substantially radially around the optical axis Ax thereof. Incidentally, each of the LEDs 2 can have a directivity of light rays in which the intensity of light rays is lowered as the emission angle is larger with respect to the optical axis Ax.

Among the LEDs 2, the upper line thereof can be composed of first LEDs 21 with the same color of light rays emitted therefrom, while the lower line thereof can be composed of second LEDs 22 with the same color of light rays different from that of the first LEDs 21.

The plurality of light guiding lenses 3 can control light rays emitted from the respective LEDs 2 and be disposed in front of the respective corresponding LEDs 2. In particular, the plurality of light guiding lenses 3 can be arranged in the corresponding manner to the plurality of LEDs 2. That is, they are also arranged in a two by three matrix.

Accordingly, the upper (three) first LEDs 21 can correspond to the upper (three) light guiding lenses 31 or the first light guiding lenses 31 among the plurality of light guiding lenses 31. Further, the lower (three) second LEDs 22 can correspond to the lower (three) second light guiding lenses 32. Thus, the plurality of first and second light guiding lenses 31 and 32 can be disposed in front of the plurality of LEDs 21 and 22, respectively. These first light guiding lenses 31 and second light guiding lenses 32 can be disposed side by side, or in close contact with each other in the vertical direction. Furthermore, the light exiting faces 34 can be configured to be continued to each other in the vertical direction and the left-right direction.

Each of the light guiding lenses 3 can have a flat plate shape or a home base shape in a plane view having a steeple on the rear side and a constant thickness. The extending direction in which the plate shape extends can be perpendicular to the vertical direction. More specifically, each of the light guiding lenses 3 can be disposed such that the optical axis Ax of the LED 2 passes through the vertical and horizontal (left-right) center of each of the light guiding lenses 3. Further, the shape of the light guiding lenses 3 can be designed to be symmetric in the vertical direction as well as in the left-right direction.

Each of the light guiding lenses 3 can include a light incident face 33 at its steeple on the rear side to receive the light rays from the LED 2, and a light exiting face 34 on the front side, perpendicular to the front-to-rear direction, so that the light rays entering through the light incident face 33 is guided through the light guiding lens 3 to exit through the light exiting face 34 forward.

Specifically, the light incident face 33 can receive the light rays from the LED 2 so as to uniformly spread the light rays in the left-right direction along the horizontal cross section (cross section substantially taken along the horizontal direction) while making the light rays parallel to one another along the vertical cross section (cross section substantially taken along the vertical direction perpendicular to the horizontal direction). Thereby, the light rays can enter the light guiding lens 30.

As can be understood from FIG. 3A (which shows a plan view), the horizontal cross section of the light incident face 33 is formed as follows. Specifically, the light incident face 33 can include a center recessed portion 33a opened rearward and two projected portions 33b disposed on both sides of the recessed portion 33a. The projected portion 33b can extend from the recessed portion 33a and be projected rearward, and then curved obliquely forward and sideward, thereby forming a smoothly continued two-humped shape.

Two connection points (or the apexes of the two-humped structure) between the recessed portion 33a and two projected portions 33b can be designed such that they are separated away from each other in the left-right direction as the points move from the horizontal plane passing through the optical axis Ax (vertical center) toward both sides in the vertical direction. The two connection points are preferably positioned on the horizontal plane at the vertical center passing through the optical axis Ax such that the emission angles of the light rays as seen from the LED 2 side are ½ to 3/2 times the half-value angle, and in the present exemplary embodiment, the two connection points are positioned such that the emission angles substantially become the half-value angle.

As shown in the horizontal cross-sectional shape of the light incident face 33, the center recessed portion 33a can be designed such that the light rays emitted from the LED 2 can enter the light guiding lens 3 while the light rays with relatively high intensity around the optical axis Ax are diffused (refracted) horizontally (in the left-right direction) to be spread over the entire light exiting face 34.

On the other hand, as illustrated in FIG. 4B, the two projected portions 33b can be configured such that the light rays emitted from the LED 2 sideward more than those toward the recessed portion 33a, having relatively low intensity, can enter the light guiding lens 3 while the light rays can be gathered forward (refracted) along the front-rear direction toward the light exiting face 34.

As illustrated in FIG. 3B, the vertical cross section of the light incident face 33 can be formed to be projected rearward with the portion at the vertical center (the position of the optical axis Ax in the vertical direction) being an apex. This light incident face 33 with the vertical cross section can receive the light rays emitted from the LED 2 while the light rays are made substantially parallel to the optical axis Ax, whereby the light rays are allowed to enter the light guiding lens 3.

The light exiting face 34 as illustrated in FIG. 2 can be an elongated surface positioned in front of the light incident face 33 and extending in the left-right direction. The light rays entering through the light incident face 33 and guided by the light guiding lens 3 can be further refracted to exit therethrough as parallel light rays substantially to the optical axis Ax (front-rear direction).

Specifically, as illustrated in FIG. 3C, the light exiting face 34 can have a plurality of prism cuts 34a formed on the entire surface of a standard face. Here, the standard face can be defined as a flat face perpendicular to the front-rear direction and extending in the left-right direction. The plurality of prism cuts 34a can be configured to make the light rays from the light incident face 33, mainly from the recessed portion 33a (as illustrated in FIG. 4A), parallel to one another. Since the light rays entering through the recessed portion 33a of the light incident face 33 at a position away more from the optical axis Ax in the left-right direction can be incident on the light exiting face 34 with a larger incident angle, the plurality of prism cuts 34a can have a plane inclined with a larger angle at a position away more from the optical axis Ax in the left-right direction.

The diffusion lens 4 can be formed in an elongated plate shape extending in the left-right direction so as to cover the front faces of the plurality of light guiding lenses 3, as illustrated in FIGS. 1 and 2. Part of the front face of the diffusion lens 4 substantially covering the entire light exiting faces 34 of the plurality of light guiding lenses 3 can serve as a diffusion face 41 configured to diffuse light rays from the plurality of light guiding lenses 3 in the vertical and horizontal directions. In order to do so, the diffusion face 41 of the diffusion lens 4 can include a plurality of diffusion lens cuts 41a formed on the entire surface thereof. In the present exemplary embodiment, the diffusion face 41 can include a plurality of projected fish-eye lens cuts arranged in a matrix shape.

With this configuration, the diffusion lens 4 can diffuse the parallel light rays projected forward through the plurality of light guiding lenses 3, in the vertical and horizontal directions by means of the plurality of diffusion lens cuts 41a of the diffusion face 41.

The vehicle lighting unit 1 can be configured such that the diffusion lens 4 can be illuminated with two types of different colored light rays by switching over the turning-on/-off of the first LEDs 21 and the second LEDs 22 having respective different emission colors.

Specifically, when the plurality of first LEDs 21 are turned on while the plurality of second LEDs 22 are turned off, the light rays emitted from the respective first LEDs 21 can enter the corresponding first light guiding lenses 31 corresponding to the first LEDs 21, so that the light rays can travel through the first light guiding lenses 31 and be projected through the entire surfaces of the light exiting faces 34. Then, the light rays can be diffused by the diffusion face 41 of the diffusion lens 4 while being projected forward. As a result, the diffusion face 41 can be illuminated with the colored light rays emitted from the first LEDs 21 over the entire length in the left-right direction (in a linear shape).

On the other hand, when the plurality of first LEDs 21 are turned off while the plurality of second LEDs 22 are turned on, the light rays emitted from the respective second LEDs 22 can enter the corresponding second light guiding lenses 32 corresponding to the second LEDs 22, so that the light rays can travel through the second light guiding lenses 32 and be projected through the entire surfaces of the light exiting faces 34. Then, the light rays can be diffused by the diffusion face 41 of the diffusion lens 4 while being projected forward. As a result, the diffusion face 41 can be illuminated with the colored light rays emitted from the second LEDs 22 over the entire length in the left-right direction (in a linear shape).

Here, when the plurality of first LEDs 21 are turned on, an upper half of the diffusion face 41 of the diffusion lens 4 can be mainly illuminated with light rays just in front of the plurality of the first light guiding lenses 31. On the contrary, when the plurality of second LEDs 22 are turned on, a lower half of the diffusion face 41 of the diffusion lens 4 can be mainly illuminated with light rays just in front of the plurality of the second light guiding lenses 32.

In the present exemplary embodiment, however, the plurality of first light guiding lenses 31 and the plurality of second light guiding lenses 32 can be disposed adjacent to one another in the vertical direction, and the light rays emitted through the respective light exiting faces 34 can be diffused by the diffusion lens 4 widely and thoroughly. Accordingly, the diffusion lens 4 can be observed as if the same portion can emit different colored light rays.

As described above, in the vehicle lighting unit 1 according to the present exemplary embodiment, the light exiting faces 34 of the first light guiding lens 31 and the second light guiding lens 32 can be configured to be long and juxtaposed with each other in the vertical direction perpendicular to a lengthwise direction thereof with the lengthwise directions coincide with each other. Furthermore, the diffusion lens 4 can have a long shape so as to cover the entire front light exiting faces 34 of the first and second light guiding lenses 31 and 32. When the first LEDs 21 are turned on, first portions of the diffusion lens 4 corresponding to the first light guiding lenses 31 can emit light, while, when the second LEDs 22 are turned on, second portions of the diffusion lens 4 corresponding to the second light guiding lenses 32 adjacent to the first portions can emit light. Since the first portions and the second portions of the diffusion lens 4 are significantly closely disposed and the diffusion lens 4 has a certain diffusion property, the portions can be seen as if the same portion can emit different colored light rays.

Furthermore, the light rays emitted forward from the LEDs 2 can be guided by the respective light guiding lenses 3 disposed in front of the LEDs 2 to exit through the light exiting faces 34 thereof. This configuration can improve the light utilizing efficiency more than that in a conventional case where a light guiding bar-shaped member with a low light utilizing efficiency is used.

Therefore, the light utilizing efficiency can be improved while the single line-shaped light emitting part (diffusion lens 4) can be illuminated with two different colored light rays.

A description will now be given of a variation of the present exemplary embodiment. The same or similar components as/to those in the above exemplary embodiment will be denoted by the same reference signs, and descriptions thereof will be omitted here.

Figure 5:
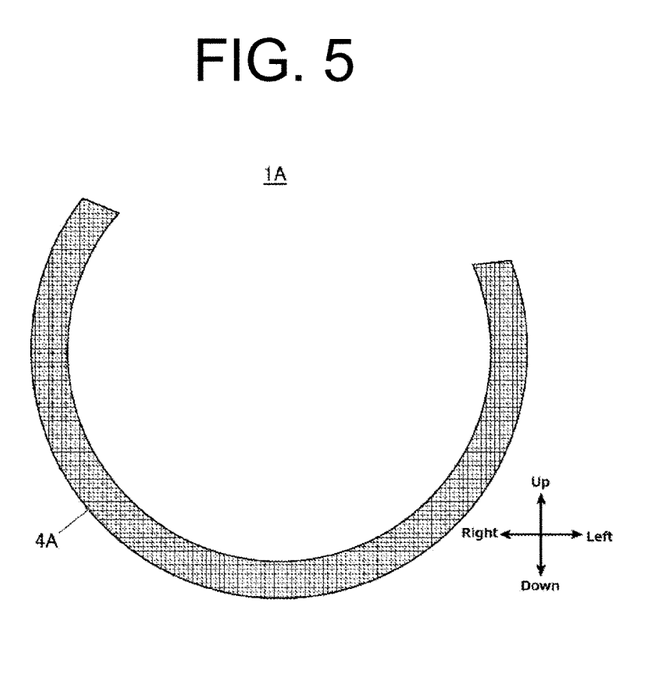
FIG. 5 is a front view of a vehicle lighting unit according to a variation of the present exemplary embodiment.
Figure 6:
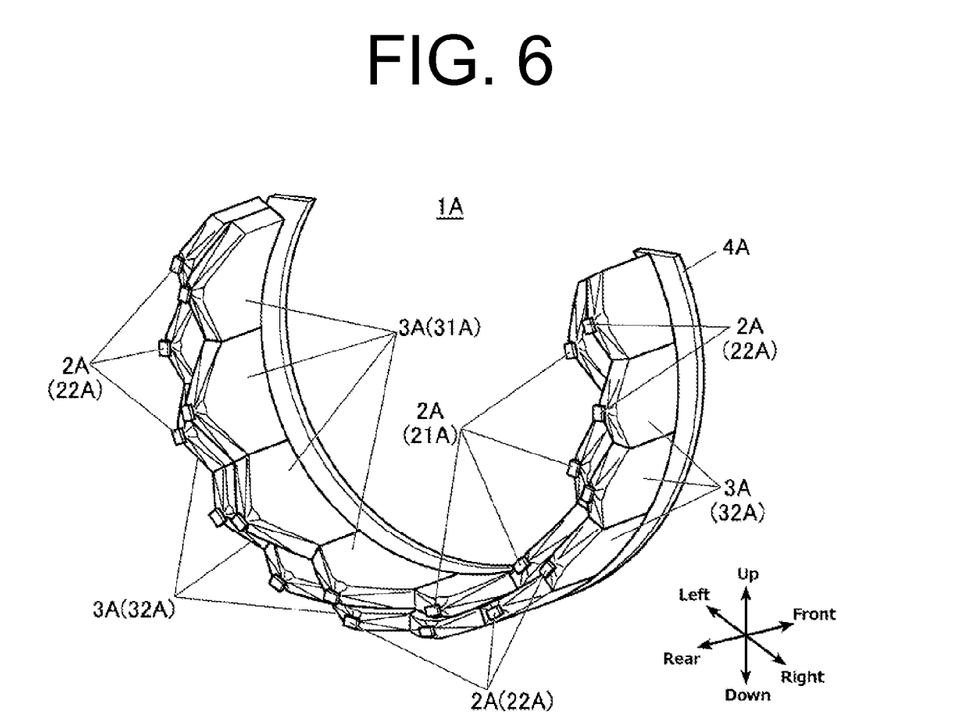
FIG. 6 is a perspective rear view illustrating the vehicle lighting unit of FIG. 5.
Figure 7:
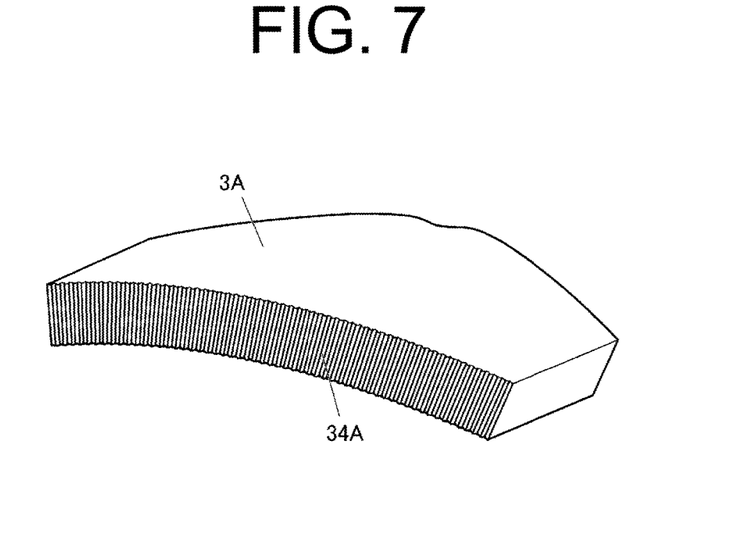
FIG. 7 is a perspective view of part of the light guiding lens in the variation of the present exemplary embodiment.

FIG. 5 is a front view of a vehicle lighting unit 1A according to a variation of the present exemplary embodiment. FIG. 6 is a perspective rear view illustrating the vehicle lighting unit 1A of FIG. 5. FIG. 7 is a perspective view of part of the light guiding lens 3A included in the vehicle lighting unit 1A.

In the present variation, the vehicle lighting unit 1A is different from the vehicle lighting unit 1 of the above-described exemplary embodiment in that the entire unit is configured to emit light in a curved line shape (or arc shape) and also in that the emission light amount is different for the two types of LEDs.

Specifically, as illustrated in FIGS. 5 and 6, the vehicle lighting unit 1A can include a plurality of LEDs 2A, a plurality of light guiding lenses 3A and a diffusion lens 4A in place of the plurality of LEDs 2, the plurality of light guiding lenses 3, and the diffusion lens 4 in the previous exemplary embodiment.

The plurality of LEDs 2A can be arranged along two arcs disposed side by side when viewed from its front side, and can include a plurality of first LEDs 21A on the inner peripheral side and a plurality of second LEDs 22A on the outer peripheral side. The emission color of the first LEDs 21A can be different from that of the second LEDs 22A. In the present variation, the color of light rays emitted from the first LEDs 21A is white while the color of light rays emitted from the second LEDs 22A is amber.

Further, in the present variation, the number of the first LEDs 21A can be different from the number of the second LEDs 22A. Specifically, the number of the first LEDs 21A (eight LEDs in the present variation) is less than the number of the second LEDs 22A (twelve LEDs in the present variation). This is because the total balance in light amount is adjusted due to the difference in emission light amounts from the respective first and second LEDs 21A and 22B. (The amount of light from one second LED 22A is less than the amount of light from one first LED 21A in the present variation.) More specifically, in the present variation, a single second LED 2 emitting amber colored light can emit light in an amount being ⅔ the amount of light emitted by a single first LED 21A emitting white light. Therefore, since an LED having a low output power and a low cost can be used as the second LED 22A, the entire cost of the vehicle lighting unit can be reduced.

Each of the plurality of light guiding lenses 3A can be formed in a curved plate shape and arranged along double curved lines when viewed from its front side. Specifically, the arrangement can be a double arc shape in the present variation. The plurality of light guiding lenses 3A can include a plurality of first light guiding lenses 31A and a plurality of second light guiding lenses 32A. The first light guiding lenses 31A can correspond to the plurality of first LEDs 21A and be arranged on the inner peripheral side. The second light guiding lenses 32A can correspond to the plurality of second LEDs 22A and be arranged on the outer peripheral side. According to the correspondence in the present variation, the number of the first light guiding lenses 31A is eight, and the number of the second light guiding lenses 32A is twelve.

Each of the light guiding lenses 3A (31A, 32A) can be configured by curving the light guiding lens 3 in the previous exemplary embodiment, for example, in the vertical direction (thickness direction), so that the light rays emitted from the corresponding one of the LEDs 2A (21A, 22A) can enter the light guiding lens 3A and be projected through the entire curved light exiting face 34A forward. Furthermore, the length of the first light guiding lens 31A and the length of the second light guiding lens 32A are different from each other due to the difference in the number of the light guiding lenses 31A and 32A, in order to make the entire length of the continued light exiting faces 34A of the first light guiding lenses 31A in the lengthwise direction equal to the entire length of the continued light exiting faces 34A of the second light guiding lenses 32A in the lengthwise direction at their adjacent sides. Furthermore, due to the respective positions in the radial direction, the first light guiding lenses 31A and the second light guiding lenses 32A can be formed to have different radius of curvatures.

As illustrated in FIG. 6, the plurality of first light guiding lenses 31A and the plurality of second light guiding lenses 32A can be disposed in proximity to each other in the radial direction (in the present variation, they are in contact with each other), so that the light exiting faces 34A are continued to one another to form an arc shape as a whole when viewed from its front side (see FIG. 5).

The diffusion lens 4A can be formed in conformity to the entire arc shape of the plurality of light guiding lenses 3A and disposed in front of the light guiding lenses 3A. With this configuration, the diffusion lens 4 can diffuse the parallel light rays from the plurality of light guiding lenses 3A while allowing the light rays to pass therethrough.

As in the vehicle lighting unit 1 according to the previous exemplary embodiment, the vehicle lighting unit 1A can be configured such that the diffusion lens 4A can be illuminated with two types of different colored light rays by switching over the turning-on/-off of the first LEDs 21A and the second LEDs 22A having respective different emission colors.

Specifically, when the plurality of first LEDs 21A are turned on while the plurality of second LEDs 22A are turned off, the diffusion face 4A can be illuminated with the colored light rays emitted from the first LEDs 21A (white) over the entire length in the arc direction (in a curved linear shape). This can make the vehicle lighting unit 1A function as a day-time running lamp (DRL).

On the other hand, when the plurality of first LEDs 21A are turned off while the plurality of second LEDs 22A are turned on, the diffusion face 4A can be illuminated with the colored light rays emitted from the second LEDs 22A (amber) over the entire length in the arc direction (in a curved linear shape). This can make the vehicle lighting unit 1A function as a signal lamp (direction indicator).

Here, when the plurality of first LEDs 21A are turned on, an inner half of the diffusion face of the diffusion lens 4A can be mainly illuminated with light rays just in front of the plurality of the first light guiding lenses 31A. On the contrary, when the plurality of second LEDs 22A are turned on, an outer half of the diffusion face of the diffusion lens 4A can be mainly illuminated with light rays just in front of the plurality of the second light guiding lenses 32A. In the present variation, however, the plurality of first light guiding lenses 31A and the plurality of second light guiding lenses 32A can be disposed adjacent to one another in the radial direction, and the light rays emitted through the respective light exiting faces 34A can be diffused by the diffusion lens 4A widely and thoroughly. Accordingly, the diffusion lens 4A can be observed as if the same portion can emit different colored light rays.

As described above, in the vehicle lighting unit 1A according to the present variation, the same advantageous effects as those derived from the previous exemplary embodiment can be obtained. In addition to this, the specific linear curved shape different from a simple linear (straight) shape can be achieved.

Furthermore, the first LED 21A can be configured to emit more amount of light rays than the second LED 22A. In addition, the number of the second LEDs 22A, which each emits less amount of light rays is larger than the number of the first LEDs, which each emits larger amount of light rays 21A, meaning that the number of the second light guiding lenses 32A is larger than the number of the first light guiding lenses 31A. The long light emission faces 34A of them can be arranged to be continued in the lengthwise direction. In this case, the lengths of the first and second light guiding lenses 31A and 32A can be adjusted so that the entire length of the continued light emission faces 34A of the first light guiding lenses 31A are equal to that of the continued light emission faces 34A of the second light guiding lenses 32A at adjacent sides.

With this configuration, even when two types of LEDs 2A (21A and 22A) each having a different amount of light rays are used, the light amounts can be appropriately balanced to emit light in the same or similar amount through the diffusion lens 4A.

It should be noted that the above-described variation has dealt with the case where a plurality of curved-plate shaped light guiding lenses 3A are used to achieve the light emission in an arc shape. However, by adjusting the radius of curvature and the connection manner of these light guiding lenses 3A, light emission in various shapes, such as a perfect circle, oval, or other curved shape can be achieved.

The previous embodiment with the linear plate light guiding lenses 3 can be combined with the curved light guiding lenses 3A with a diffusion lens having the corresponding shape. This configuration can achieve light emission in various shapes, including a curved linear light emitting unit to be provided along a peripheral edge of a complex curved lighting unit.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:
1. A vehicle lighting unit comprising:
a first LED and a second LED each having a different color;
a first light guiding lens and a second light guiding lens that are disposed in front of the first LED and the second LED, respectively, the first light guiding lens and the second light guiding lens configured to guide light rays emitted from the first LED and the second LED, respectively, to cause the light rays to exit through respective light exiting faces of the first and second guiding lenses forward; and
a diffusion lens disposed in front of the first light guiding lens and the second light guiding lens, configured to diffuse the light rays exiting from the first light guiding lens and the second light guiding lens while allowing the light rays to pass therethrough forward,
wherein:
the light exiting faces of the first light guiding lens and the second light guiding lens are each configured to be long and juxtaposed with each other in a direction perpendicular to a lengthwise direction thereof with the lengthwise directions coincide with each other;
the diffusion lens has a long shape so as to cover the entire front light exiting faces of the first and second light guiding lenses;
the first LED is configured to emit more amount of light rays than the second LED;
the vehicle lighting unit has a plurality of the second LEDs, the number of which is larger than the number of the first LEDs;

the number of the second light guiding lenses is larger than the number of the first light guiding lenses according to the numbers of the first LEDs and the second LEDs;

the second light guiding lenses are disposed such that the light exiting faces thereof are continuously arranged in its longitudinal direction;

if two or more first light guiding lenses are provided, the first light guiding lenses are disposed such that the light exiting faces thereof are continuously arranged in its longitudinal direction; and a length of the first light guiding lens is made different from a length of the second light guiding lens so that an entire length of the light emission faces of the first light guiding lens(es) is equal to an entire length of the light emission faces of the second light guiding lenses.

2. The vehicle lighting unit according to claim 1, wherein the first light guiding lens and the second light guiding lens are provided to be formed in a curved-line shape as a whole when viewed from their front side.

3. The vehicle lighting unit according to claim 1, wherein the first LED emits light color of which is white and the second LED emits light color of which is amber.

4. A vehicle lighting unit comprising:

a first LED and a second LED each having a different color;

a first light guiding lens and a second light guiding lens that are disposed in front of the first LED and the second LED, respectively, the first light guiding lens and the second light guiding lens configured to guide light rays emitted from the first LED and the second LED, respectively, to cause the light rays to exit through respective light exiting faces of the first and second guiding lenses forward; and a diffusion lens disposed in front of the first light guiding lens and the second light guiding lens, configured to diffuse the light rays exiting from the first light guiding lens and the second light guiding lens while allowing the light rays to pass therethrough forward, wherein:

the light exiting faces of the first light guiding lens and the second light guiding lens are each configured to be long and juxtaposed with each other in a direction perpendicular to a lengthwise direction thereof with the lengthwise directions coincide with each other;

the diffusion lens has a long shape so as to cover the entire front light exiting faces of the first and second light guiding lenses; and the first light guiding lens and the second light guiding lens are provided to be formed in a curved-line shape as a whole when viewed from their front side.

5. The vehicle lighting unit according to claim 4, wherein the first LED emits light color of which is white and the second LED emits light color of which is amber.

6. A vehicle lighting unit comprising:

a plurality of first LEDs having a first emission color and a plurality of second LEDs having a second emission color;

a plurality of first light guiding lenses disposed in front of the first LEDs in a direction of light emission and each having a light incident face and a light exiting face;

a plurality of second light guiding lenses disposed in front of the second LEDs in a direction of light emission and each having a light incident face and a light exiting face; and a diffusion lens disposed in front of the light exiting faces of the first light guiding lenses and the second light guiding lenses, the diffusion lens having a diffusion face, the diffusion lens being configured to allow the light rays exiting from the first light guiding lenses and the second light guiding lenses to pass through the diffusion face forward, wherein:

the light exiting faces of the first light guiding lenses and the second light guiding lenses are juxtaposed with each other to form a linear shape as a whole;

the diffusion lens has a shape so as to cover the entire front light exiting faces of the first and second light guiding lenses;

the first LED emit white light; and each first LED is configured to emit more amount of light rays than each second LED.

7. The vehicle lighting unit according to claim 6, wherein the first light guiding lenses and the second light guiding lenses are provided to be formed in a curved-line shape as a whole when viewed from their front side.

* * * * *